(12) United States Patent
Culver et al.

(10) Patent No.: US 8,173,294 B2
(45) Date of Patent: May 8, 2012

(54) HIGH VOLTAGE MODULAR BATTERY WITH ELECTRICALLY-INSULATED CELL MODULE AND INTERCONNECTOR PERIPHERIES

(75) Inventors: Duncan Culver, Howell, NJ (US); Christopher K. Dyer, Madison, NJ (US); Michael L. Epstein, Bedminster, NJ (US)

(73) Assignee: Lightening Energy, Dover, NJ (US)

( * ) Notice: Subject to any disclaimer, the term of this patent is extended or adjusted under 35 U.S.C. 154(b) by 299 days.

(21) Appl. No.: 12/650,814

(22) Filed: Dec. 31, 2009

(65) Prior Publication Data
US 2010/0273044 A1 Oct. 28, 2010

Related U.S. Application Data

(60) Provisional application No. 61/214,743, filed on Apr. 28, 2009.

(51) Int. Cl.
*H01M 2/24* (2006.01)
(52) U.S. Cl. .......... 429/158; 429/96; 429/149; 429/156; 429/157; 429/161
(58) Field of Classification Search .................... 429/96, 429/149, 156, 157, 158, 161
See application file for complete search history.

(56) References Cited

U.S. PATENT DOCUMENTS

| | | | |
|---|---|---|---|
| 5,393,617 A | 2/1995 | Klein | |
| 5,552,243 A | 9/1996 | Klein | |
| 2001/0049054 A1 | 12/2001 | Ecomoto et al. | |
| 2002/0136946 A1 | 9/2002 | Amatucci et al. | |
| 2003/0013009 A1* | 1/2003 | Dansui et al. | 429/120 |
| 2004/0038123 A1* | 2/2004 | Hisamitsu et al. | 429/147 |
| 2005/0214638 A1* | 9/2005 | Asahina et al. | 429/160 |
| 2006/0057433 A1 | 3/2006 | Ando et al. | |
| 2006/0188776 A1 | 8/2006 | Aker et al. | |
| 2007/0015047 A1* | 1/2007 | Hosaka et al. | 429/66 |
| 2007/0128472 A1 | 6/2007 | Tierney | |
| 2008/0070102 A1 | 3/2008 | Watanabe | |
| 2008/0070106 A1* | 3/2008 | Hock et al. | 429/143 |
| 2009/0305125 A1* | 12/2009 | Kosugi et al. | 429/149 |
| 2010/0104927 A1 | 4/2010 | Albright | |
| 2010/0167116 A1 | 7/2010 | Okada | |

FOREIGN PATENT DOCUMENTS

WO  WO 2007086495 A1 *  8/2007

* cited by examiner

*Primary Examiner* — Barbara Gilliam
*Assistant Examiner* — Zachary Best
(74) *Attorney, Agent, or Firm* — Davidson, Davidson & Kappel, LLC

(57) ABSTRACT

A modular battery includes a housing, a first planar battery cell having a first planar electrode surface, a second planar battery cell having a second planar electrode surface, and an interconnector disposed between the first planar surface and the second planar surface and electrically connecting the first and second planar electrode surfaces, side peripheries of the interconnector, the first and second planar battery cells being electrically insulated from the housing.
A method is also provided.

24 Claims, 11 Drawing Sheets

Positive

9

10

Negative

Positive

14

15

Negative

Positive                                    Negative

HIGH VOLTAGE MODULAR BATTERY WITH ELECTRICALLY-INSULATED CELL MODULE AND INTERCONNECTOR PERIPHERIES

This claims priority to U.S. Provisional Patent Application No. 61/214,743, filed Apr. 28, 2009 and hereby incorporated by reference herein.

BACKGROUND

Modular batteries are batteries which comprise two or more battery cells or cell modules or cells. A common example of a device using a modular battery is a hand held flashlight which may use for example two C cells.

Recently, modular batteries have become important in many applications, including hybrid electric vehicles ("HEV"), plug-in hybrid electric vehicles ("PHEV"), and other applications. When used in HEV, PHEV, and other applications, in addition to being durable, safe and cost effective, modular batteries are required to deliver a great deal of power.

Applications of modular batteries, like the hand-held flashlight, require the use of multiple battery cells connected in series. However, the modular batteries for HEVs and PHEVs, for example, may differ from the modular C cells used in a common flashlight.

U.S. Pat. Nos. 5,552,243 and 5,393,617 disclose a bipolar electrochemical battery of stacked wafer cells. The wafer cells are electrically connected in series with the positive face of each cell contacting the negative face of the adjacent cell. The cell-to-cell contact may be enhanced by use of a conductive paste or cement. The stack assembly is held in compression. U.S. Pat. Nos. 5,552,243 and 5,393,617 are hereby incorporated by reference herein.

SUMMARY OF THE INVENTION

The present invention provides a modular battery comprising a housing, a first planar battery cell having a first planar electrode surface, a second planar battery cell having a second planar electrode surface, and an interconnector disposed between the first planar surface and the second planar surface and electrically connecting the first and second planar electrode surfaces, side peripheries of the interconnector, the first and second planar battery cells being electrically insulated from the housing.

The present invention also provides a method for forming a modular battery comprising: placing a first planar battery cell having a first planar electrode surface in a housing, placing an interconnector over the first planar battery cell in the housing, placing a second planar battery cell having a second planar electrode surface in the housing, so that the interconnector electrically connects the first and second planar electrode surfaces and side peripheries of the interconnector, the first and second planar battery cells being electrically insulated from the housing.

BRIEF DESCRIPTION OF THE DRAWINGS

The present invention will be described with respect to a preferred embodiment, in which:

FIG. 3A is a schematic front view of a sealed single cell showing the cell module with the front frame section removed, while

FIG. 6A schematically illustrates a cross-section of a modular battery having six cell modules within an enclosure with feedthroughs, while FIG. 6B shows a plan view; while

Figure 1A:
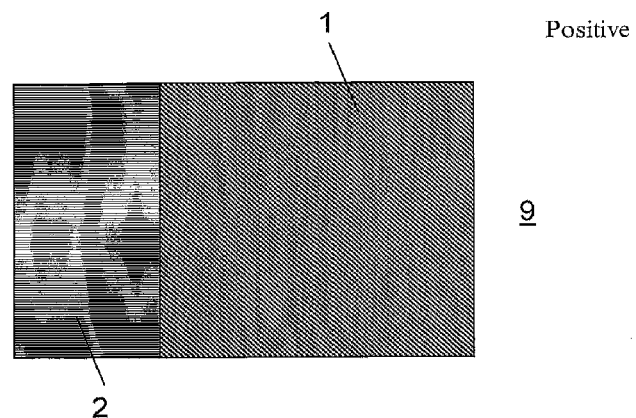
FIGS. 1A, 1B, 1C and 1D are plan views of four types of electrodes that may be used in the present invention.

The drawings are schematic in nature and not to scale. For clarity and ease of understanding, some elements have been exaggerated in size.

DETAILED DESCRIPTION

In order to be powerful enough for HEVs, PHEVs, and other applications, it is desirable to use modular batteries containing cells with a high surface to volume ratio, for example using a planar design for each cell of the battery. These cells may be, for example, about the size of a large book wherein the "front" of the book contains, for example, a positive terminal (also known as an electrode) and the "back" of the book contains, for example, a negative terminal. Unlike their cylindrical counterparts (e.g., C cell batteries) which use a raised dimple at one end of a cell to make electrical contact with the next cylindrical cell, substantially planar cells need not have such raised dimple(s).

For many applications requiring high electrical power including HEVs and PHEVs, it is desirable that the battery delivers electrical power at a high voltage in order to reduce the required current needed to supply the electrical power which in turn will beneficially reduce the need for high-current carrying materials to the devices using the electrical power. Electrical power is the multiple of voltage and current and high voltage delivery of electrical power to a device, for example an electric motor, will require thinner or less conductive current carriers (for example, copper wire) to the device which will reduce their cost. Electric vehicles, for example, may require a battery to provide electrical power at 300 to 600 volts. This high voltage is typically achieved by externally connecting multiple lower voltage battery modules electrically in series. This is in part due to safety considerations in assembling and operating a series connected "stack" of typical "pouch" cells within a battery module, since at higher voltages and especially above approximately 60 Volts, there is a significant risk of electrical arcing and a severe shock hazard since the edge peripheries of "flat" cells such as typical "pouch" cells have their cell terminals exposed. For safety these cell terminals are connected electrically in series within a low voltage battery module, for example, having less than 60 volts.

An object of the present invention is to provide interconnectors and cell modules each with electrically-insulating peripheries to protect against accidental electrical arcing and during assembly and operation of a multi-celled high voltage battery where only the battery end terminations are exposed. A single battery module of the present invention could contain up to a hundred or more individual cell modules safely interconnected internally with no intermediate cell module electrical terminations exposed between the battery module end terminations. A single battery module of the present invention can be safely built with multiple cell modules to have an output of 300 volts or more. A further alternate or additional object of the present invention is to promote heat transfer from the individual cell modules to the outside environment via the thermally-conducting, electrically-insulating peripheries of the cell modules and their interconnectors. Yet a further additional or alternate object of the invention is to provide for ease of installation and assembly and/or disassembly of a modular battery.

Cell Module

The cell module of the preferred embodiment of the present invention can have a rigid or semi-rigid flat shape with a positive and a negative surface on opposite sides which are in electrical communication with adjacent cell modules to form a higher voltage battery stack of cell modules. Within each cell module there are arranged multiple positive and negative electrodes, with each positive and negative electrode electrically connected in parallel to each of the other electrodes of the same polarity. The electrodes are made with any suitable lithium ion battery material for the positive and negative electrodes. For example, the positive active material, or the cathode, may include lithium manganese oxide, lithium cobalt oxide or lithium iron phosphate electrochemically-active material coated onto aluminum The negative active material, or the anode, may include, for example, synthetic graphite or lithium titanate spinel, coated onto copper (or aluminum where the anode is lithium titanate spinel).

Figure 1B:
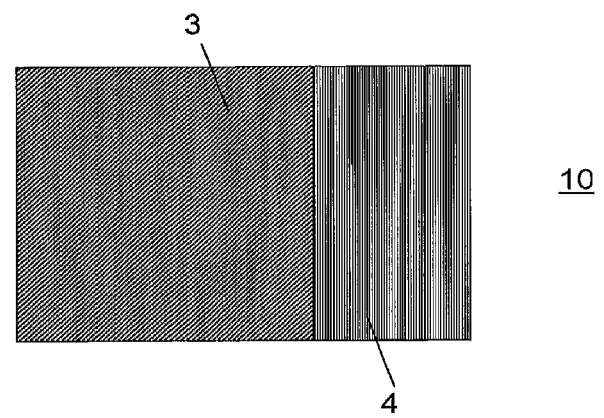
Figure 1C:
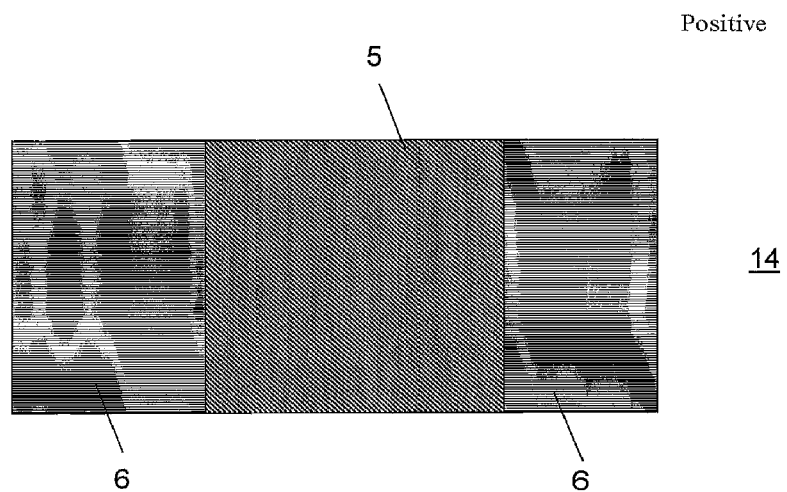
Figure 1D:
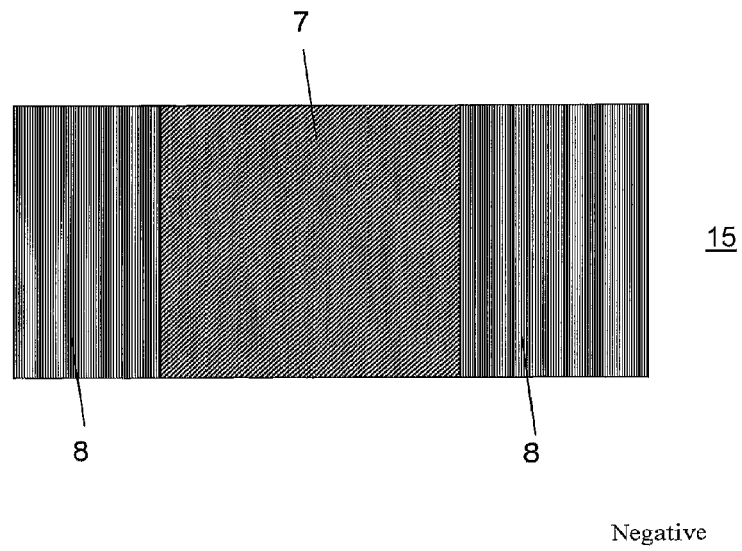

The cell module incorporates multiple electrodes which, in the illustrated embodiments, have four patterns of active material coatings as shown in FIGS. 1A-1D. FIG. 1A illustrates an interior positive electrode 9 (e.g., aluminum) that is coated on both sides with a cathode active material 1 and that has a bare (uncoated) foil tab 2 on one side, and FIG. 1B illustrates an interior negative electrode 10 (e.g., copper or aluminum) that is coated on both sides with an anode active material 3 and that has a bare (uncoated) foil tab 4 on the opposite side to the positive tab. FIG. 1C illustrates a positive end-electrode 14 that is coated on one side only with a cathode active material 5 and that has one or two bare foil tabs 6, and FIG. 1D illustrates a negative end-electrode 15 that is coated on one side only with an anode active material 7 and that has one or two bare foil tabs 8. The advantage of two end plate tabs is to allow improved subsequent sealing of the electrodes in the cell module. In this embodiment, the electrodes 9, 10, 14, 15 are in the form of plates of rectangular shape, it being understood that electrodes of other suitable forms and shapes can be used depending on the desired configuration of the cell module and other design considerations.

Both sides of the end electrodes 14 and 15 that are at opposite ends of the assembled cell module may be uncoated and the surfaces cleaned and etched to achieve improved subsequent sealing to the cell module. The cell module in the present invention preferably is well sealed from water vapor and air ingress.

Figure 2:
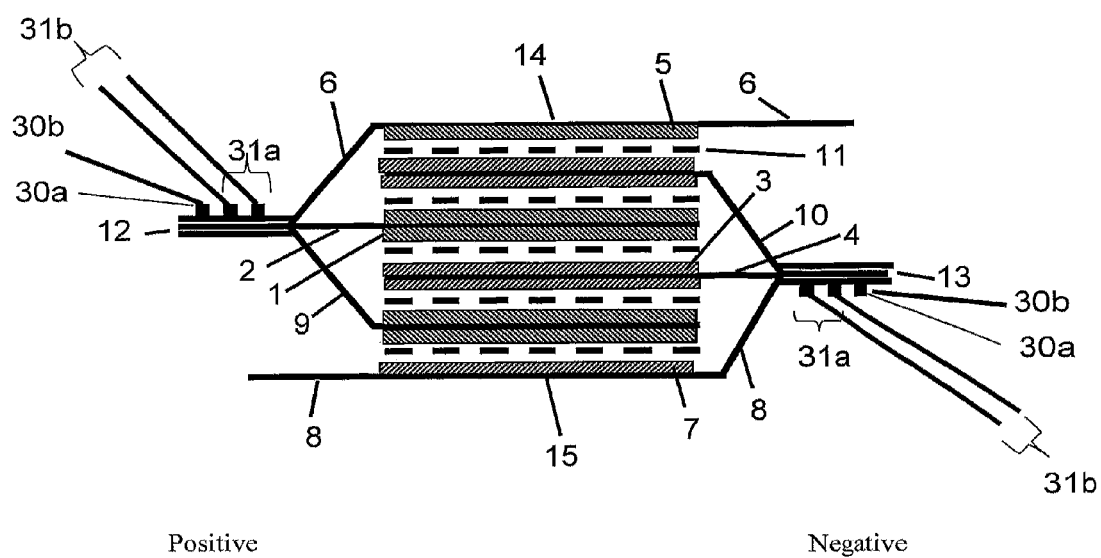
FIG. 2 is a schematic cross section of the electrode arrangement within a single cell module with interleaving electrodes and separators.

In FIG. 2, the positive and negative electrodes (electrode plates) 9, 10, 14, 15 illustrated in FIGS. 1A-1D are shown assembled within a single cell module. In the drawings, the thickness of the active material coatings 1, 3, 5, 7 is greatly exaggerated for clarity. The positive and negative electrodes are electrically connected in parallel to multiple others of the same polarity to form an interleaved electrode assembly which is terminated by the positive end-electrode 14 and the negative end-electrode 15 of the single cell module. As illustrated in FIGS. 1C-1D and FIG. 2, the positive end-electrode plate 14 has two tabs 6 and the negative end-electrode plate 15 has two tabs 8. One of the tabs 6 of the positive end-electrode plate 14 is connected, preferably by welding, to the tabs 2 of the positive electrode plates 9 to form an end tab 12 which constitutes or is connected to a positive terminal of the cell module. In similar fashion, one of the tabs 8 of the negative end-electrode plate 15 is connected, preferably by welding, to the tabs 4 of the negative electrode plates 10 to form an end tab 13 which constitutes or is connected to a negative terminal of the cell module. Between the end-electrode plates 14, are positive electrodes 9 interleaved with negative electrodes 10, and between each electrode is a layer of separator 11, with sufficient electrical insulating properties such as a microporous polyolefin, containing electrolyte. In FIG. 2, the end-electrode plates 14 and 15 are shown coated on one side only while their other sides are uncoated and through the end tabs 12 and 13 respectively, their other sides present outer positive and negative cell-termination surfaces respectively for subsequent high voltage battery assembly through the interconnectors of the present invention.

In actual practice, the number of electrodes and separator layers is varied and selected to achieve the required electrochemical energy storage capacity and the power required. In addition to increasing the electrochemical energy storage, a larger number of electrodes will allow higher rates of charge and discharge for the same amount of energy. The larger surface area with multiple electrodes in the present invention lowers the specific electrochemical current density per unit electrode area within the cell module, i.e., the amperes per square centimeter of electrode is reduced for a larger number of electrodes so that the electrodes can deliver more total current at a lower current density with less loss in delivery voltage. In batteries, high electrode current density results in reduced battery voltage due to the well-known electrochemical principles of electrode polarization or voltage loss. A multiple of more than 30 electrode pairs, in practice, could typically be bonded with a welder, such as an ultrasonic metal welder, into welded end tabs 12 and 13 of the positive and negative electrodes, respectively. The electrode tabs are preferably connected along the full lengths thereof on opposite sides of the electrode cell module, as illustrated by the end tab 12 on the positive side of the cell module and the end tab 13 on the negative side. The outside top surface of the cell module presents the bare foil surface of the positive end-electrode 14 and the outside bottom surface presents the bare metal surface of the negative end-electrode 15. Voltage and temperature sensors attached to the individual tabs or to the electrode tabs provide early information related to safety due to their close proximity to the electrode active materials, and such sensors may be connected to a control system.

Figure 3A:
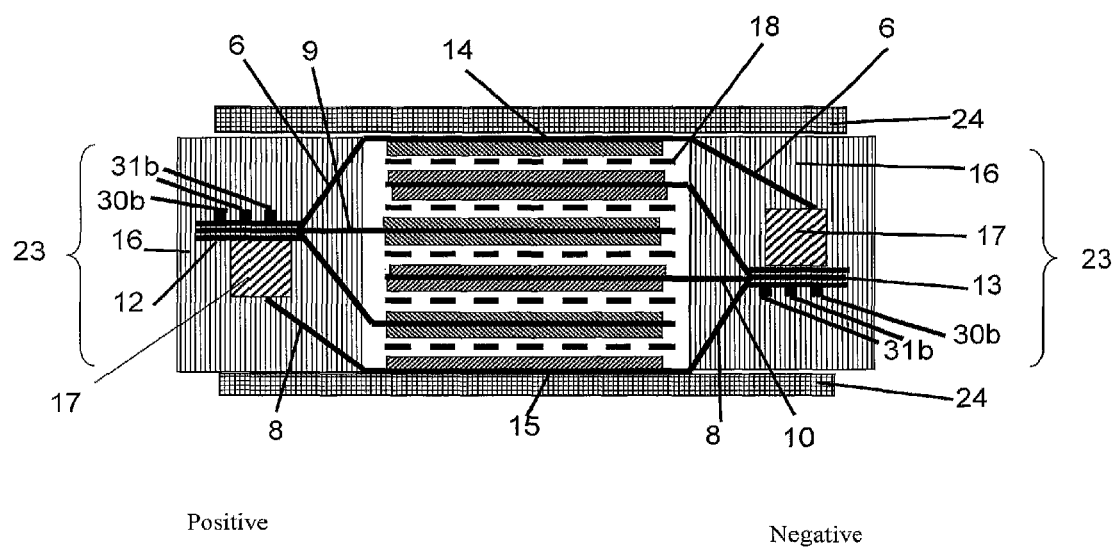

The sealing of the interleaved electrode assembly of FIG. 2 is illustrated in FIG. 3A with the positive and negative active materials shown in cross section for each electrode. As noted above, the end-electrode plates 14, 15 have two tabs and are coated with active material on only one side. Each of the positive and negative end tabs 12 and 13 is sealed with an electrically insulating sealant 16 at the opposite edges of the cell module 23 and electrically isolated one from the other by an insulator 17 where the opposite polarity tabs overlap on the same side as illustrated in FIG. 3A. The sealant 16 may also be thermally conducting in order to remove heat from the cell module. More particularly, the insulator 17 on the left side of the cell module 23 electrically isolates the tab 8 of the negative end-electrode 15 from the positive end tab 12, and the insulator 17 on the right side electrically isolates the tab 6 of the positive end-electrode 14 from the negative end tab 13. Also in FIG. 3A is shown a gap 18 between the sealant 16 and the ends of the electrodes 9, 10 and the separators 11. The material of the sealant 16 may also seal a plastic frame 19 (FIG. 5) to the interleaved electrode assembly on each of the sides orthogonal to the sealed end tabs 12 and 13. Methods of sealing include insert-molding, injection molding, fusion welding and adhesive (both reactive, e.g., epoxy, and hot-melt).

Figure 3B:
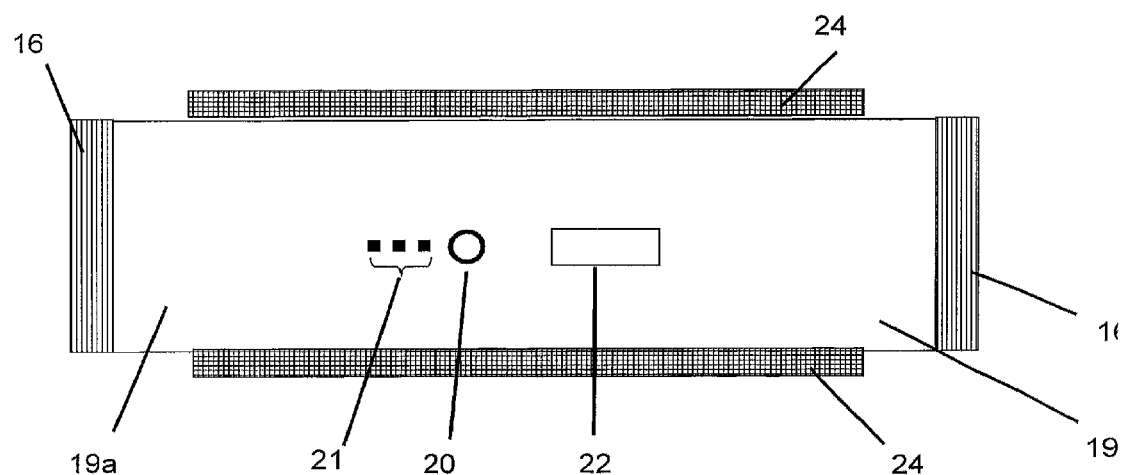
FIG. 3B shows the cell module with the front frame section in place, and both FIGS. 3A and 3B showing placement of interconnectors according to the present invention.
Figure 4:
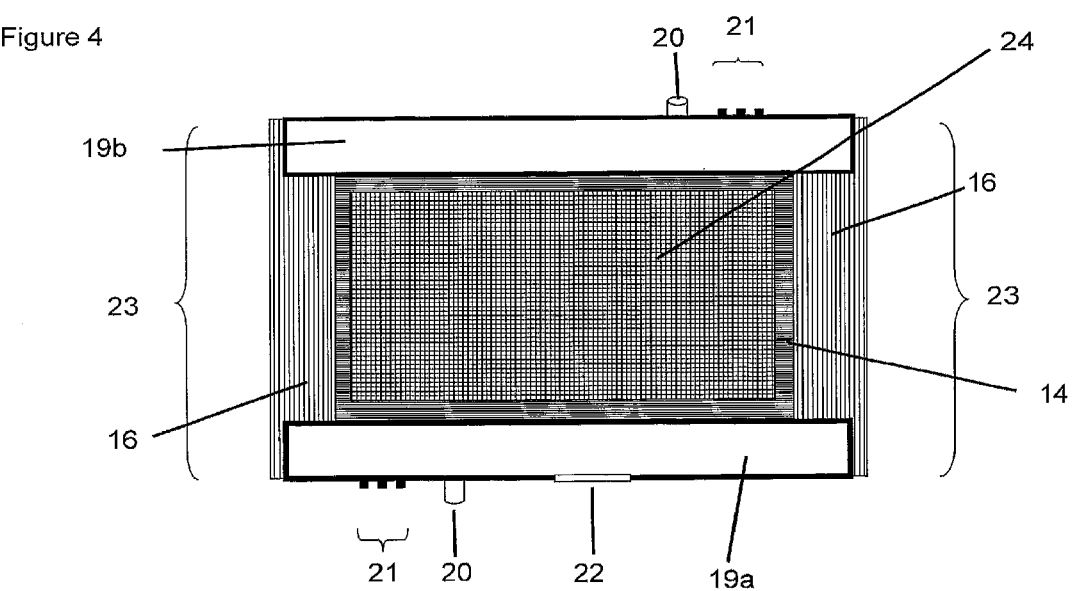
FIG. 4 is a plan view of the cell module with an interconnector on top and showing the plastic frame with feedthroughs, burst disc and ports.
Figure 5:
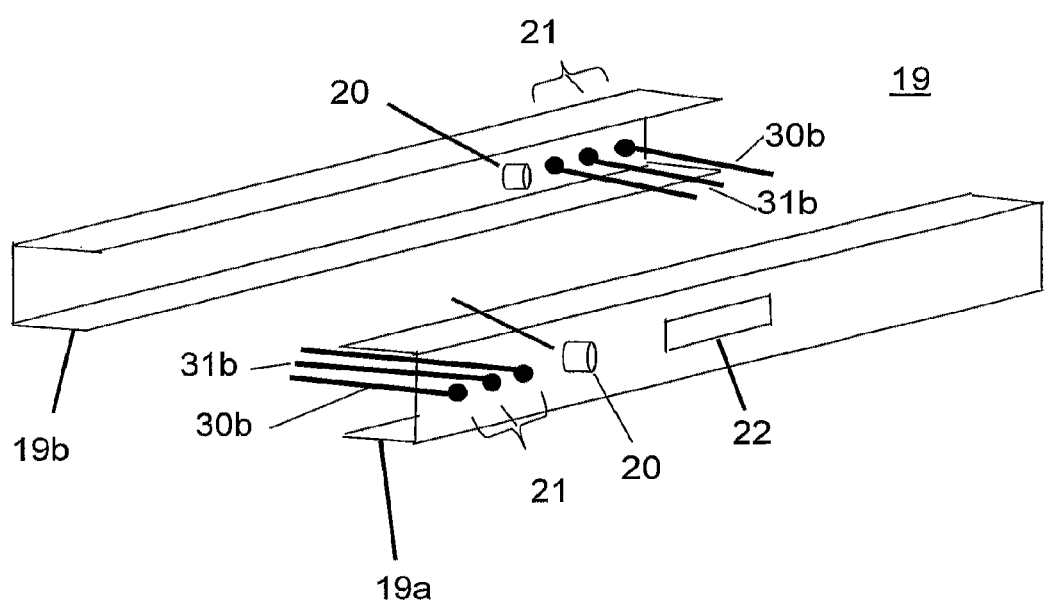
FIG. 5 is a perspective view of the plastic frame with communicating feedthroughs for filling, sealing and sensing.

As shown in FIGS. 4 and 5, the plastic frame 19 is a two-part electrically insulating frame having front and rear, generally C-shaped, frame sections 19a, 19b that are inserted over the interleaved electrode assembly and the sealant 16 at the front and rear of the cell module 23 and sealed thereto. The plastic frame 19 may also be thermally conducting in order to remove heat from the cell module. FIG. 3A shows the cell module 23 without the frame 19a, and FIG. 3B shows the cell module 23 with the front frame section 19a sealed to the cell module. FIG. 3B illustrates features incorporated in the frame 19a including a port 20 for evacuating, filling and draining the cell module with electrolyte which can also be permanently or temporarily sealed by mechanical means, electrical feedthroughs 21 for measuring and monitoring individual cell voltages and temperatures, and a burst disc 22 to relieve any pressure build up within the cell module 23.

In order to electrically connect stacked cell modules 23 in series, electrically conductive compressible interconnectors 24 are interposed between adjacent cell modules. FIG. 3 shows upper and lower interconnectors 24 for series connection to additional cell modules above and below the illustrated cell module 23. FIG. 4 is a top plan view of the sealed cell module 23 with the upper interconnector 24 included and the outside surface (bare foil surface) of the negative end-electrode 15 of the cell module in contact with the lower interconnector 24. The interconnectors as illustrated in FIGS. 3 and 4 in the present invention do not extend beyond the periphery of the cell module in order to protect against electrical arcing or shock should contact be made with the periphery during interconnection of multiple cell modules during assembly of the battery module of the present invention. Protection against electrical arcing or shock on peripheral contact, could also be accomplished by electrically insulating the side peripheries of the electrically-conducting interconnector materials.

As illustrated in FIGS. 2 and 3A, the tabs 2, 4, 6, 8 of the electrode plates are shown sharply bent at an angle to overlap one another to form the end tabs 12, 13. It is of course possible, and sometimes preferable, to bend the tabs with a curvature rather than the sharp bending shown. Also, as illustrated in FIGS. 1C and 1D, the widths of the tabs 6 and 8 of the end-electrode plates 14, 15 could be different on opposite sides (left/right sides) of the end-electrode plates, the wider width tabs being connected to the end tabs or terminals 12, 13 and the narrower width tabs sitting on the insulators 17. The ports 20 are preferably placed on diagonal corners for subsequently filling and vacuum degassing the cell module after formation.

In this embodiment, as shown in FIGS. 2, 3A and 3B, voltage sensors 30a are attached to both the positive end tab 12 and the negative end tab 13, which permit monitoring the voltage of any cell within a battery stack of cell modules and adjusting its state of charge to balance cells within a multi-cell-module battery through an external battery management system (BMS). Temperature sensors 31a, such as thermistors, are mounted in contact with both the positive end tab 12 and the negative end tab 13 to monitor the temperature of the electrodes of the cell module 23. The voltage sensors 30a and the temperature sensors 31a are electrically connected by sense lines (conductors) 30b and 31b, respectively, to the electrical feedthroughs 21 provided in the front and rear frame sections 19a, 19b, as illustrated in FIG. 5. The cell module 23 is furnished with the burst disc 22 to relieve excess internal pressure in the event of a catastrophic cell failure.

The complete cell module 23 is intended as a manufacturing module that may be handled in a dry-room, dry-box or other controlled environment throughout cell formation and vacuum degassing. In addition to measurement of the individual cell module voltages, the voltage sensors may also be used to measure any resistive component between the cell modules, for example, arising at the mechanical contacts between the interconnector 24 and the positive end-electrode 14 of one cell module and between the interconnector 24 and the negative end-electrode 15 of an adjacent cell module. As discussed herein, although use of an inert gas in the vicinity of the interconnector electrical contacts is desirable to prevent or reduce the development of an electrically-resistive layer between the interconnector and the cell module electrical surface contact, the capability to continuously monitor the electrical resistivity of such mechanical contacts is an additional benefit and feature of the present invention.

In an automated assembly process, or in mass manufacturing, all four sides of the interleaved electrode assembly may be sealed into the plastic frame 19 in a single step while simultaneously incorporating fill holes, burstable areas and embedded sensor wiring in the same or subsequent refinement steps. In an automated manufacturing process, the plastic frame may be eliminated entirely by, for example, use of injection molding in which the interleaved electrode assembly of FIG. 2 is placed between top and bottom molds each in contact with the other and enclosing an open continuous perimeter volume into which an electronically-insulating polymeric sealing material is injected to make a continuous cell module perimeter seal incorporating perhaps prior-positioned fill tubes, sensors and thin areas for burst protection.

Interconnector

Figure 6A:
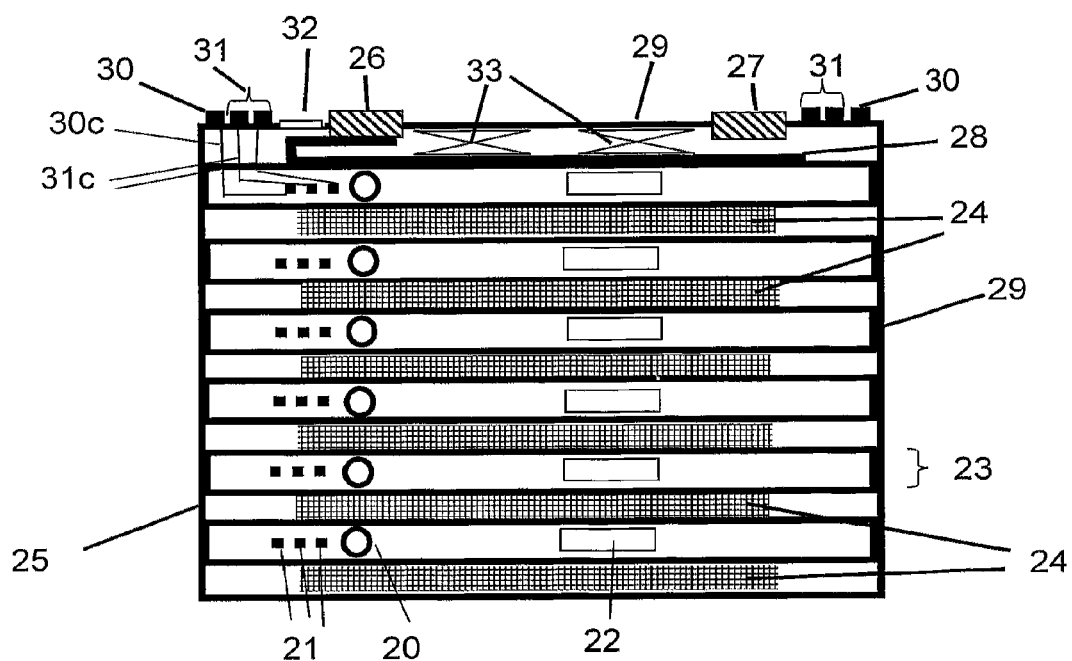

The present invention provides interconnectors 24, shown for Example in FIG. 6A, which advantageously can be compressible to provide cushioning for shocks or vibrations between the planar cell modules 23. The interconnectors 24 for example can be compressible flexible conductive sheets that provide a multiplicity of parallel conduction paths. The flexibility of the interconnectors 24 can accommodate cyclic strains within the cell stack during charging and discharging the battery, while maintaining electrical contact between the cell plane modules through application of a force that assures good contact and low electrical resistance between the modules. The compressible interconnectors 24 can be made of any material that has sufficient properties such as, for example a wire mesh, metal or carbon fibers or strips retained in a compressible elastomeric matrix or non-woven pad, or an interwoven conducting mat, consistent with the requirement for a compressible flexible electrically-conducting interconnection between adjacent cell plate module surfaces. The contacting surfaces of the cell modules can be chosen to maintain a long-term, low-resistance connection interface with the surfaces of the positive and negative connections of the cell module.

The mesh for example can be of filaments of approximately 4 mils, or 0.004 inches. The compressibility of the interconnector can be for example 30 percent, so that for example upon application of sufficient force to reduce spacings in the weave, the volume of the interconnect decreases to 70 percent of the volume prior to application of force. Thus an interconnect layer having a thickness of 10 mils can compress to a thickness of 7 mils upon pressure on the planar surfaces, given a layer structure in which during this compression the layer does not expand out of the sides perpendicular to the pressure direction. Preferably, the compressibility of the interconnector is such that the volume can compress to less than 90 percent.

In addition, certain interconnectors of the present invention advantageously can improve the conductivity of the cell module connection, as opposed to the prior art using direct metal-to-metal contact between adjacent cells or the use of conducting cements or pastes between adjacent cells. Table 1 shows various materials that were used to make compressible weaves or felts of interconnector material in accordance with the present invention. Some of the fibers had a surface finish to improve stability of the contact material of the interconnector.

TABLE 1

Materials Used for Interconnector Pads of the Present Invention

| Material | Fiber | Surface Finish | Thickness Inch | Pad Weight gram/in2 |
|---|---|---|---|---|
| A | copper/steel wire | Tin | 0.020 | 0.33 |
| B | monel wire | None | 0.020 | 0.31 |
| C | aluminum wire | None | 0.021 | 0.10 |
| D | nylon felt | Silver | 0.072 | 0.24 |
| E | woven nylon | Silver | 0.015 | 0.08 |
| F | carbon fiber | Nickel | 0.018 | 0.25 |
| G | non-woven polyester | Copper | 0.012 | 0.04 |
| H | non-woven polyester | Nickel | 0.014 | 0.17 |

Interconnectors in the form of one inch square pads of material made from the materials illustrated in Table 1 were placed between pressure plates surfaced with metal foils of Al or copper (Al and Cu simulate the outer surfaces of the example Li ion cell modules of the present invention) and the electrical resistance was measured on application of electrical current and mechanical pressure to the interconnector pads via the pressure plates with Al or Cu foil surfaces. The resulting electrical resistances measured under the same conditions and for the same areas of interconnector are shown in Table 2. The pressure applied was approximately 10 pounds per square inch.

TABLE 2

Electrical Resistance Values for Interconnection between Al and Cu Surfaces

| Lower Foil | Upper Foil | Interconnector | Interconnection Resistance (milliohms) |
|---|---|---|---|
| aluminum | aluminum | None | 35 |
| copper | aluminum | None | 3.0 |
| aluminum | aluminum | A | <1 |
| aluminum | aluminum | B | 2.5 |
| aluminum | aluminum | C | 37 |
| aluminum | aluminum | D | 5.1 |
| aluminum | aluminum | E | 2.8 |
| aluminum | aluminum | F | 18 |
| aluminum | aluminum | G | 2.8 |
| aluminum | aluminum | H | 127 |
| copper | aluminum | A | <1 |
| copper | aluminum | B | 3.0 |
| copper | aluminum | Conducting Silver Cement | 40 |

TABLE 2-continued

Electrical Resistance Values for Interconnection between Al and Cu Surfaces

| Lower Foil | Upper Foil | Interconnector | Interconnection Resistance (milliohms) |
|---|---|---|---|
| copper | aluminum | Conducting Graphitic Cement | 130 |
| copper | aluminum | Conducting Paste | 2.6 |

Interconnector A for example is a preferred embodiment of the interconnector of the present invention, and may for example be made from electromagnetic interference/radio frequency interference shielding products such as gaskets available from the MAJR Products Corporation of Saegertown, Pa.

Several of the interconnectors 24 of the present invention, in addition to reducing shock and vibrations, for example from road shock, can improve or maintain electrical resistance. Continuity in current flow between interconnected cell modules in the presence of vibrations is also an important safety and reliability feature for the vehicle because if there were a diminution or a single point break in continuity of current flow, reduced or no power output from the battery could be obtained since a single point break or diminution in current flow between any pair of cell modules in any modular battery would also "disconnect" or diminish current flow respectively for all of the other series-connected cell modules from power delivery for the vehicle, which essentially immobilizes the entire vehicle. This could also become a vehicle safety issue in an emergency situation where the vehicle must avoid a road accident for instance. The use of compressible springy interconnectors in accordance with the present invention can avoid the occurrence and effects of a "single point failure" or diminution of current flow and sharply contrasts with the use of conductive cements and pastes in the prior art which may not be capable of withstanding excessive vibrations or continual road shocks without physically breaking or changing electrical connectivity and current continuity.

The interconnectors also have the advantage of being removable to permit easy removal of the cell modules and replacement of defective cell modules.

The interconnectors preferably are used between aluminum-aluminum or aluminum-copper end electrodes of a cell module, and preferably include nickel, tin, silver or copper, and most preferably copper or silver. To improve and maintain the interface connection, the surfaces of the interconnectors 24 may for example be surface treated, such as by tin plating or indium plating.

To illustrate the advantages of the present invention in absorbing vibrations (pressure changes) without change of electrical resistance, Table 3 shows the effect of pressure on the electrical resistance of the compressible interconnector of the present invention at different applied pressures. Increase in the pressure applied to a one inch square pad of interconnect material A (Table 1) produced no further reduction in electrical resistance above an applied pressure of 15 pounds per square inch (psi).

TABLE 3

Electrical Resistance Values for Interconnection
Material A between Al and Cu Surfaces

| Pressure (psi) applied to interconnector pad (A) between Cu and Al Foils | Interconnection Resistance (milliohms) |
|---|---|
| 0 | 0.19 |
| 10 | 0.06 |
| 15 | 0.01 |
| 20 | 0.01 |

Modular Battery

Figure 6B:
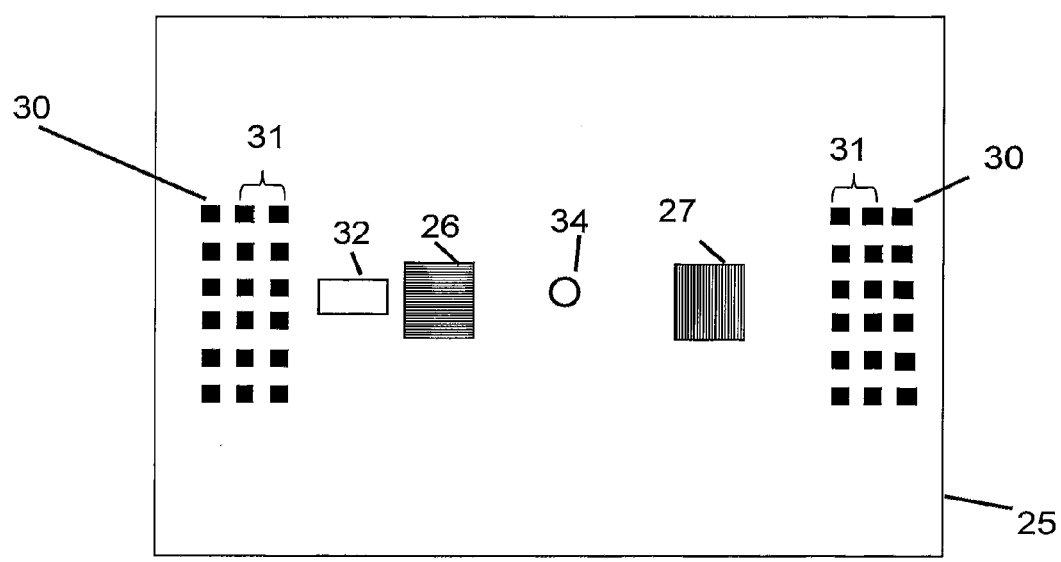
Figure 6C:
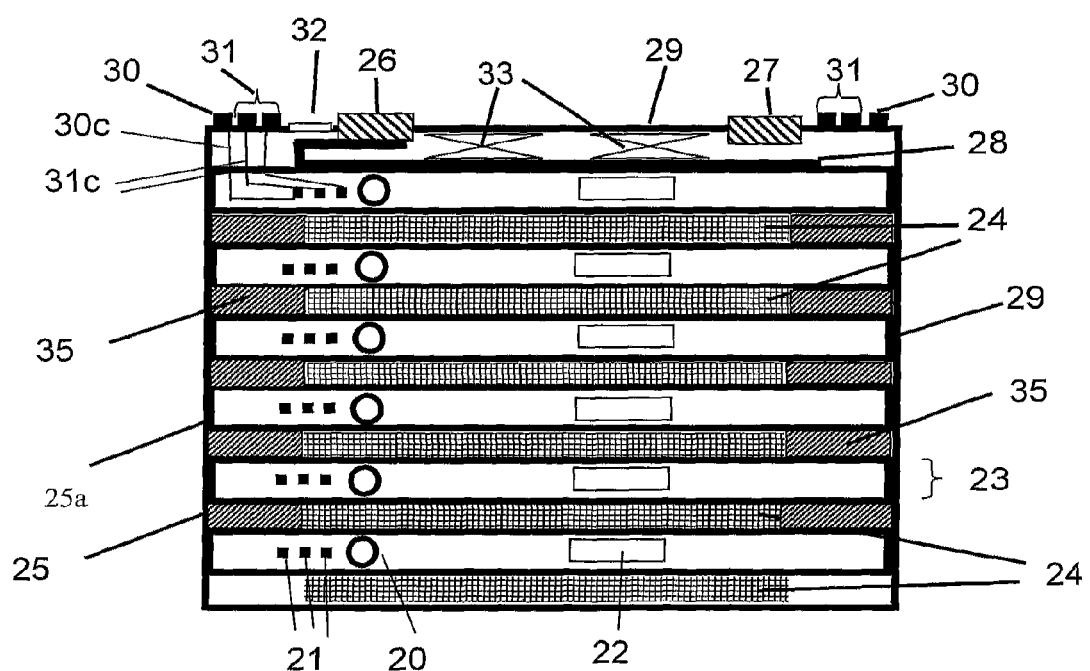
FIG. 6C shows the interconnector with an insulating side periphery.

FIGS. 6A and 6C illustrate how multiple cell modules can be arranged electrically in series to form a battery stack to provide a high-voltage and high-power modular battery while also protecting against electrical arcing and shock on peripheral contact during assembly of the multi-celled high voltage battery. FIG. 6A shows six cell modules stacked one on another electrically in series and separated by the compressible interconnectors 24 of the present invention which serve to electrically connect in series one cell module to the next cell module and which are not electrically in contact with the edge periphery of the stack of cell modules or the wall of the battery module housing or enclosure. It is noted that several interconnectors can be present between two cell modules, for example 8 layers, each 10 mils in thickness. Thus the space between cell modules for example can be 80 mils, and compressible to 60 mils when in use.

By way of example and as described above, the positive cell module surface may be made of aluminum and the negative cell module surface made of copper. As shown in FIG. 6A the interconnectors 24 do not extend beyond the side peripheries of the cell modules and so do not electrically contact the inner walls of the battery enclosure, while simultaneously maintaining electrical isolation from other interconnectors within the stack of cell modules. Electrical insulation of the side peripheries of the interconnectors 24 may be achieved by the gas, for example inert gas, filled space enclosed by the side peripheries of the interconnectors 24 and the cell modules 23 and the inner walls of the enclosure. Electrical insulation could also be achieved by application of an electrical insulator to the side peripheries of the interconnectors as shown by sealant or a gasket 35 in FIG. 6C.

In the illustrative example in FIG. 6A, six cell modules 23 are contained in a stacked array within an enclosure 25 which, in this embodiment, is of rectangular cross section. The enclosure 25 is a hermetically-sealed case, which for example may be made from aluminum, preferably either fabricated from sheet metal or made of cast construction. To permit stacking and assembly of the cell modules 23, and removal and replacement of individual cell modules after assembly, the top or bottom, or one of the sides, of the enclosure 25 is detachably connected to the enclosure by threaded bolts or other suitable fasteners. The enclosure 25 provides the ability to locate the cell modules and interconnectors in a stack in a robust mechanical configuration that withstands shock and vibration in the battery operating environment and if electrically conducting also serves as the negative connection for power to and from the battery. In FIG. 6A, six cell modules are shown for illustrative purposes, whereas a practical battery may accommodate from 10 to 100 cell modules or more. The present invention allows a large number of cell modules to be interconnected to make a very high-voltage battery stack preferably the number of cells is at least 50 and the voltage at least 150 Volts.

The sides of the enclosure 25 in FIG. 6A may be thermally but not electrically in contact with the interconnectors 24 to facilitate heat transfer to the outside environment by adding thermally conductive but electrically insulating material to the side periphery of the interconnectors as illustrated in FIG. 6C, via for example a sealant or gasket 35. Examples of thermally conductive but electrically insulating materials for elements 16, 19, 35 of the present invention include filled polymers. At least two, but even all four sides of the enclosure 25 are in thermal contact only with the side peripheral edges of the cell modules 23 and interconnectors 24 to maximize heat transfer to the outside environment. Thermal contact between the cell modules 23 and the walls of the enclosure 25 is furnished by a layer of thermally conductive but electrically insulating material 25a, such as for example an electrically-insulating coating from hard anodizing of an aluminum enclosure on the interior of the enclosure, in addition an elastomeric electrically-insulating and thermally-conducting gasket 35 around the side peripheral edge of each interconnector, may also be included to further improve heat removal although any material with suitable thermally-conductive and electrically-insulating properties could be used. Heat dissipation from the cell modules may be further enhanced by adding fins to the exterior of the enclosure (thereby improving convective heat-transfer), and by back-filling the interior volume of the enclosure with helium gas (thereby improving conductive heat transfer). Filling the enclosure with an inert gas also reduces the potential for undesirable metal oxidation which may increase the electrical resistance of the interconnection points between the interconnectors and the external surfaces of the cell modules. Aluminum is particularly susceptible to such oxidation in the presence of air and can form a hard electrically-resistive oxide film.

Selection of electrode active materials that undergo thermodynamic cooling on charge or discharge is also advantageous in reducing heat generation and temperature rise in a battery since on discharge Ohmic heating occurs proportional to the square of the discharge current ($i^2R$). Ohmic heating can be counteracted by the thermodynamic cooling to reduce the rate of temperature rise on charging or discharging.

The enclosure 25 incorporates feedthroughs for the power input and output terminals, namely, a positive terminal 26 and a negative terminal 27. The power terminals connect internally to the ends of the cell module battery stack through an internal power bus 28 for the positive terminal 26 and the electrically conductive enclosure 25 serves as the negative bus 29 to the negative terminal 27. The terminals 26 and 27 are electrically insulated one from the other by for example at least one electrically-insulated feedthrough from the bus to the terminal of the same polarity. The enclosure 25 is provided with external multipin connectors 30 and 31 for monitoring cell voltage and cell temperature, respectively, and these connectors may be positioned in the same region as the power terminals 26 and 27. In the illustrated embodiment, there are six sets of multipin connectors 30 and 31 (FIG. 6B), one set for each cell module 23. The sense lines 30b and 31b of each cell module are connected via the electrical feedthroughs 21 to sense lines 30c and 31c which, in turn, are connected to respective ones of the multipin connectors 30 and 31. To facilitate removal and replacement of individual cell modules 23 from the stacked array, the sense lines 30c, 31c may be connected to the feedthroughs 21 by pin-and-socket connectors or other suitable connectors that permit easy attachment and detachment. In FIG. 6A, the internal connections of the sense lines 30c, 31c from the multipin connectors 30 and 31 to the cell modules 23 are only shown for one cell module. In practice, connections could run to some or all cell modules in the battery stack. Data acquisition, as discussed above, from the individual sensors 30a and 31a is sent to a stand-alone or an integrated analysis, control and communications module within the overall vehicle system. An external pressure relief device 32 may be provided to safely handle any high pressure failure modes of the battery stack. The use of multipin connectors 30 and 31 in the present invention facilitates replacement of individual cell modules.

Although the present invention is illustrated herein with an electrically conducting enclosure 25, it could also be made of a non-electrically-conducting material, in which case a separate negative bus 29 would connect the negative surface of the cell module 23 at the one end of the stack of cell modules 23 to the negative terminal 27 of the battery. An advantage for example of using a non-metallic electrically insulating enclosure 25 could be lower cost and lighter weight. Use of heat-conducting material in the walls of the enclosure to facilitate heat removal from the cell modules to the outside of the enclosure 25 would be advantageous as would be the use of active or passive cooling means adjacent to the outside walls of the enclosure 25, for example, a heat absorbing material or flowing coolant in contact with the outside walls of the enclosure would benefit heat dissipation.

For lower electrical resistance between cell modules 23 in the battery stack, pressure can be applied to the compressible interconnectors 24 between the cell modules 23. An example of how this might be readily achieved is shown in FIG. 6A where a spring 33 is located at the top of the enclosure 25 and positioned between the positive electrical bus 28 and the top of the enclosure 25. Spring 33 transmits pressure to the interconnectors 24 within the stack of cell modules 23. Additionally, or as an alternative, a spring may be incorporated at the bottom of the enclosure 25 to apply pressure from below to the stack of cell modules 23 and interconnectors 24. The positive electrical bus 28 is electrically insulated from the enclosure 25, for example by use of an electrically insulated spring 33.

In FIG. 6A, the terminals 26 and 27 and the multipin connectors 30 and 31 and the burst disc 32 and gas port 34 are illustrated as being positioned on the top surface of the enclosure 25, where the surface is parallel to the end electrodes 14 and 15. In accordance with the present invention, all of these elements could be positioned on one or more sides of the enclosure 25

The enclosure 25 provides the following features: a means of compression of the stack of cell modules, a hermetically sealed enclosure, and a means for electrical connection to the surfaces of the end cell modules.

During operation of the battery of the present invention, an electronic management system may be provided to continuously monitor cell module voltages and cell module temperatures, as well as the voltage drop across the interconnectors. Such extensive monitoring of battery function with such close coupling of the sense points to cells, allows for improved battery monitoring and leads to improved battery safety. A simple schematic data monitoring and alerting arrangement between a central monitoring center and an HEV is shown in FIG. 7.

Figure 7:
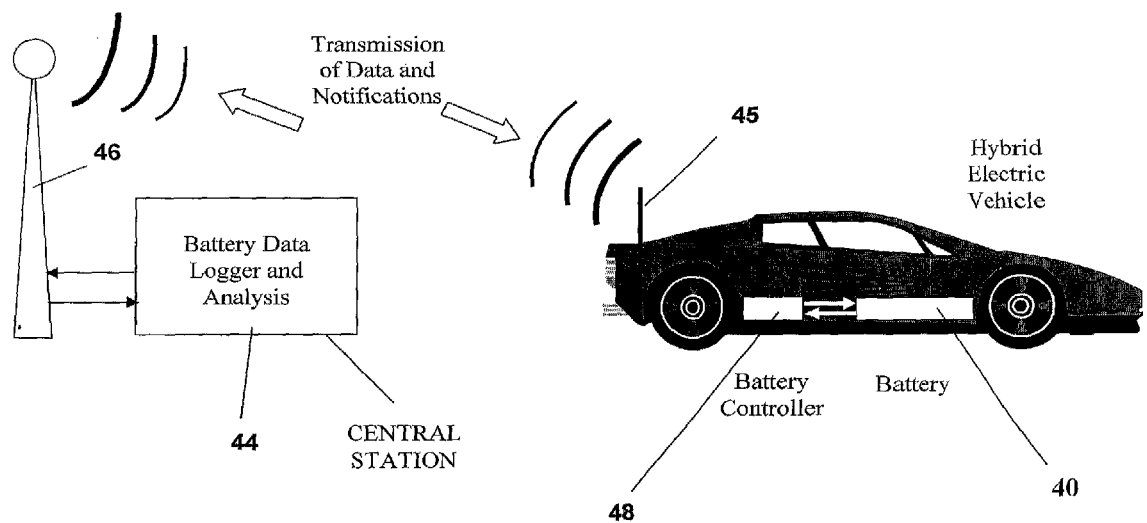
FIG. 7 is an explanatory view illustrating remote monitoring and alerting of the battery and its cell modules.

In FIG. 7, an HEY is equipped with a battery 40 comprised of multiple series-connected cell modules constructed according to the present invention. The battery 40 is connected to a battery controller 48 which monitors and controls the battery performance in a manner known in the art. The battery controller 48 communicates with a central station 44 through a wireless communications network which includes an antenna 45 mounted on the HEV and a central station antenna 46. The battery controller 48 continuously monitors the voltage and temperature of each cell module and, when necessary, reduces the current flow through one or more cell modules to maintain the current at a safe level. The battery controller 48 transmits monitoring data to the central station 44 and receives notification data from the central station to regulate operation of the battery 40.

Charge transfer through the voltage sense leads may be used to keep the electrochemical capacity of the cells in balance. High-voltage and/or high temperature indications would trigger the battery management system to take corrective action, such as disconnecting the battery from its charging source—an important safety feature particularly for HEV applications. Drift of parameters over time could be an indicator for required maintenance. The battery of the present invention with its separable connections between cell modules readily permits electrically-safe battery disassembly and replacement of defective components, greatly extending the service life of the entire battery built in the inventive manner.

The use of planar or flat electrodes in the cell module of the present invention allows thicker coatings of positive and negative material to be used on the electrode plates than can be practically used with electrodes which have to be bent to make, for example, a cylindrical cell in which the electrodes are bent to form a spiral, which is a common method of construction of many battery cells. There are limitations to the thicknesses of coatings on electrodes that have to be bent into a spiral form for cylindrical cells, because bending of an electrode with a thick coating of active material can cause stress within the thick coating which can result in cracking of the active material and subsequent loss of direct electrical contact to the supporting and conducting surface which, in turn, would reduce the usable Ampere-hour (Ah) capacity particularly at high electrical currents. A significant increase in the available Ah capacity of a cell module of the present invention can be achieved with the use of planar or flat electrodes with thicker coatings of the active materials and such increase in capacity would be attained with an increase in the specific energy density (Watt-hours per unit weight or volume) because of the relative increase in the ratio of weight and volume of the active material to the weight and volume of the inactive materials of the electrode, principally the active material supporting structures (for example the copper and aluminum active material supports of the examples given herein)

Although the electrodes in the illustrated embodiments are disclosed as preferably having a square or rectangular planar form, other planar forms can be made in accordance with the present invention. For example, a cell module of the present invention can also be of cylindrical form by, for example, cutting the positive and negative electrodes into the form of planar discs and interleaving them with a separator in an offset manner to allow for subsequent welding together of all the positive electrode planar discs and separately all of the negative electrode planar discs. The perimeter sealing of the welded stack of interleaved electrodes with sensing and filling feedthroughs could be accomplished using a curved frame, for example, semicircular. The resulting cell modules would resemble in appearance thick discs or flattened cylinders which would then be stacked on one another and electrically connected with the interconnectors of the present invention and subsequently sealed into an enclosure to make a cylindrical multicell battery with a positive end surface disc and a negative end surface disc. The flexibility in shape, size and form factors of the cell module of the present invention enables maximum utilization of available space within an application requiring a battery and enable flexible customizable manufacturing of cell modules.

While the invention herein described is illustrated with particular reference to a lithium battery, other battery chemistries would benefit from the invention. In particular, batteries requiring very high rates of charge and discharge as in HEV applications would especially benefit due to the large interconnection area between adjacent cell modules and the large number of the positive and negative electrodes. Such a large interconnection area between adjacent cell modules which is made possible with the present invention lowers the specific current density, i.e., the amperes per square centimeter, so that the electrodes can deliver more total current at a lower current density with less voltage loss for the cell module. In batteries, high current density on an electrode results in reduced battery voltage due to the well known electrochemical principles of electrode polarization. The electrical insulation of the side peripheries of the cell modules and the internal interconnectors between the cell modules from electrical shock on external contact, allows high voltage batteries to be safely built, maintained and recycled.

Battery chemistries benefiting from the present invention include all lithium batteries, as well as Pb-acid, Ni-metal hydride, Ni—Zn, and other rechargeable as well as primary or non-rechargeable batteries.

It will be appreciated by those ordinarily skilled in the art that obvious variations and changes can be made to the examples and embodiments described in the foregoing description without departing from the broad inventive concept thereof. It is understood, therefore, that this disclosure is not limited to the particular examples and embodiments disclosed, but is intended to cover all obvious modifications thereof which are within the scope and the spirit of the disclosure as defined by the appended claims.

What is claimed is:

1. A modular battery comprising:
   a housing,
   a first planar battery cell including a plurality of first electrodes, one of the first electrodes having a first planar electrode surface,
   a second planar battery cell including a plurality of second electrodes, one of the second electrodes having a second planar electrode surface, and
   an interconnector disposed between the first planar electrode surface and the second planar electrode surface and electrically connecting the first and second planar electrode surfaces, side peripheries of the interconnector, the first planar battery cell and second planar battery cell being electrically insulated from the housing, the interconnector being positioned parallel to the first planar electrode surface and the second planar electrode surface so as to space the first electrodes from the second electrodes,
   wherein the plurality of first electrodes includes a plurality of first positive electrodes and a plurality of first negative electrodes, the first positive electrodes being electrically and physically connected to each other at a first longitudinal end of the first planar battery cell, the first negative electrodes being electrically and physically connected to each other at a second longitudinal end of the first planar battery cell, the interconnector extending in a longitudinal direction along the first planar electrode surface from the first longitudinal end to the second longitudinal end.

2. The modular battery as recited in claim 1 wherein the first and second planar battery cells include an electrically insulating material on their side peripheries and contact the housing.

3. The modular battery as recited in claim 1 wherein the first and second planar battery cells include a thermally conducting material on their side peripheries and contact the housing.

4. The modular battery as recited in claim 1 wherein an inside of the housing is electrically insulating and thermally conducting.

5. The modular battery as recited in claim 2 wherein the interconnector is spaced from the housing.

6. The modular battery as recited in claim 1 wherein the interconnector is spaced from the housing so as to define a spacing.

7. The modular battery as recited in claim 6 wherein an inert gas fills the spacing.

8. The modular battery as recited in claim 6 further comprising a sealant thermally connecting the side periphery of the interconnector to the housing.

9. The modular battery as recited in claim 8 wherein the sealant contains a polymer.

10. The modular battery as recited in claim 6 further comprising a gasket in the spacing.

11. The modular battery as recited in claim 1 further comprising further planar battery cells and further interconnectors.

12. The modular battery as recited in claim 1 wherein the first electrode having the first planar electrode surface is formed by a first positive end electrode and the second electrode including the second planar electrode surface is formed by a first negative end electrode.

13. The modular battery as recited in claim 12 wherein the plurality of second electrodes includes at least one further negative electrode, the plurality of positive electrodes being electrically connected to the interconnector via the first positive end electrode, the at least one further negative electrode being electrically connected to the interconnector via the first negative end electrode.

14. The modular battery as recited in claim 1 further comprising a second interconnector and a third interconnector, one of the first electrodes including an additional first planar electrode surface and one of the second electrodes including an additional second planer electrode surface, the second interconnector electrically connected to the additional first planar electrode surface, the third interconnector electrically connected to the additional second planar electrode surface,
   the interconnector, the second interconnector, the third interconnector, the first plan electrode surface, the second planar electrode surface, the additional first planar electrode surface and the additional second planar electrode surface being stacked parallel to each other.

15. The modular battery as recited in claim 1 wherein the interconnector includes a first electrically connecting planar side and a second electrically connecting planar side, the first electrically connecting planar side being parallel and in contact with the first planar electrode surface, the second electrically connecting planar side being parallel and in contact with the second planar electrode surface.

16. The modular battery as recited in claim 15 wherein the first planar electrode surface covers an entirety of the first electrically connecting planar side and the second planar electrode surface covers an entirety of the second electrically connecting planar side.

17. A method for forming a modular battery comprising:
   placing a first planar battery cell in a housing, the first planar battery cell including a plurality of first electrodes, one of the first electrodes having a first planar electrode surface the plurality of first electrodes including a plurality of first positive electrodes and a plurality of first negative electrodes, the first positive electrodes being electrically and physically connected to each other at a first longitudinal end of the first planar battery cell, the first negative electrodes being electrically and physically connected to each other at a second longitudinal end of the first planar battery cell, placing an interconnector over the first planar electrode surface in the housing such that the interconnector is positioned parallel to the first planar electrode surface, placing a second planar battery cell in the housing, the second planar battery cell including a plurality of second electrodes, one of the second electrodes having a second planar electrode surface, the second planar electrode surface being placed over the interconnector parallel to the interconnector, so that the interconnector electrically connects the first and second planar electrode surfaces and side peripheries of the interconnector, the first planar battery cell and the second planar battery cell being electrically insulated from the housing, and so that the interconnector extends in a longitudinal direction along the first planar electrode surface from the first longitudinal end to the second longitudinal end.

18. The method as recited in claim 17 further comprising injecting a sealant into the housing to thermally connect the side periphery of the interconnector to the housing.

19. The method as recited in claim 17 further comprising injecting an inert gas into the housing.

20. The method as recited in claim 17 further comprising placing a gasket around the side periphery of the interconnector.

21. The method as recited in claim 17 wherein the interconnector includes a first electrically connecting side and a second electrically connecting side, interconnector being placed over the first planar electrode surface and the second planar electrode surface being placed over the interconnector such that the first electrically connecting planar side is parallel and in contact with the first planar electrode surface, the second electrically connecting planar side is parallel and in contact with the second planar electrode surface.

22. The method as recited in claim 21 wherein the interconnector is placed over the first planar electrode surface and the second planar electrode surface is placed over the interconnector such that the first planar electrode surface covers an entirety of the first electrically connecting planar side and the second planar electrode surface covers an entirety of the second electrically connecting planar side.

23. A modular battery comprising:
a housing,
a first planar battery cell including a plurality of first electrodes, one of the first electrodes having a first planar electrode surface,
a second planar battery cell including a plurality of second electrodes, one of the second electrodes having a second planar electrode surface, and
an interconnector disposed between the first planar electrode surface and the second planar electrode surface and electrically connecting the first and second planar electrode surfaces, side peripheries of the interconnector, the first planar battery cell and second planar battery cell being electrically insulated from the housing, the interconnector being positioned parallel to the first planar electrode surface and the second planar electrode surface so as to space the first electrodes from the second electrodes,
wherein the first electrode having the first planar electrode surface is formed by a first positive end electrode and the second electrode including the second planar electrode surfaces is formed by a first negative end electrode,
wherein the plurality of first electrodes includes at least one further positive electrode and the plurality of second electrode includes at least one further negative electrode, the at least one further positive electrode being electrically connected to the interconnector via the first positive end electrode, the at least one further negative electrode being electrically connected to the interconnector via the first negative end electrode,
wherein the first positive end electrode and the at least one further positive electrode are connected to each other at ends thereof independently of the interconnector and the second negative end electrode and the at least one further negative electrode are connected to each other at ends thereof independently of the interconnector.

24. A method for forming a modular battery comprising:
placing a first planar battery cell in a housing, the first planar battery cell including a plurality of first electrodes, one of the first electrodes having a first planar electrode surface, the first electrode having the first planar electrode surface being formed by a first positive end electrode, the plurality of first electrodes including at least one further positive electrode, placing an interconnector over the first planar electrode surface in the housing such that the interconnector is positioned parallel to the first planar electrode surface, placing a second planar battery cell in the housing, the second planar battery cell including a plurality of second electrodes, one of the second electrodes having a second planar electrode surface, the second planar electrode surface being placed over the interconnector parallel to the interconnector, the second electrode including the second planar electrode surface being formed by a first negative end electrode, the plurality of second electrodes includes at least one further negative electrode, so that the interconnector electrically connects the first and second planar electrode surface and side peripheries of the interconnector, the first planar battery cell and the second planar battery cell being electrically insulated from the housing, and so that the at least one further positive electrode is electrically connected to the interconnector via the first positive end electrode, the at least one further negative electrode is electrically connected to the interconnector via the first negative end electrode, the first positive end electrode and the at least one further positive electrode are connected to each other at ends thereof independently of the interconnector and the second negative end electrode and the at least one further negative electrode are connected to each other at ends thereof independently of the interconnector.

* * * * *